F. W. HARRIS.
SYSTEM OF ELECTRIC DISTRIBUTION AND CIRCUIT CONTROL.
APPLICATION FILED OCT. 7, 1908.
1,123,283.
Patented Jan. 5, 1915.
2 SHEETS—SHEET 1.
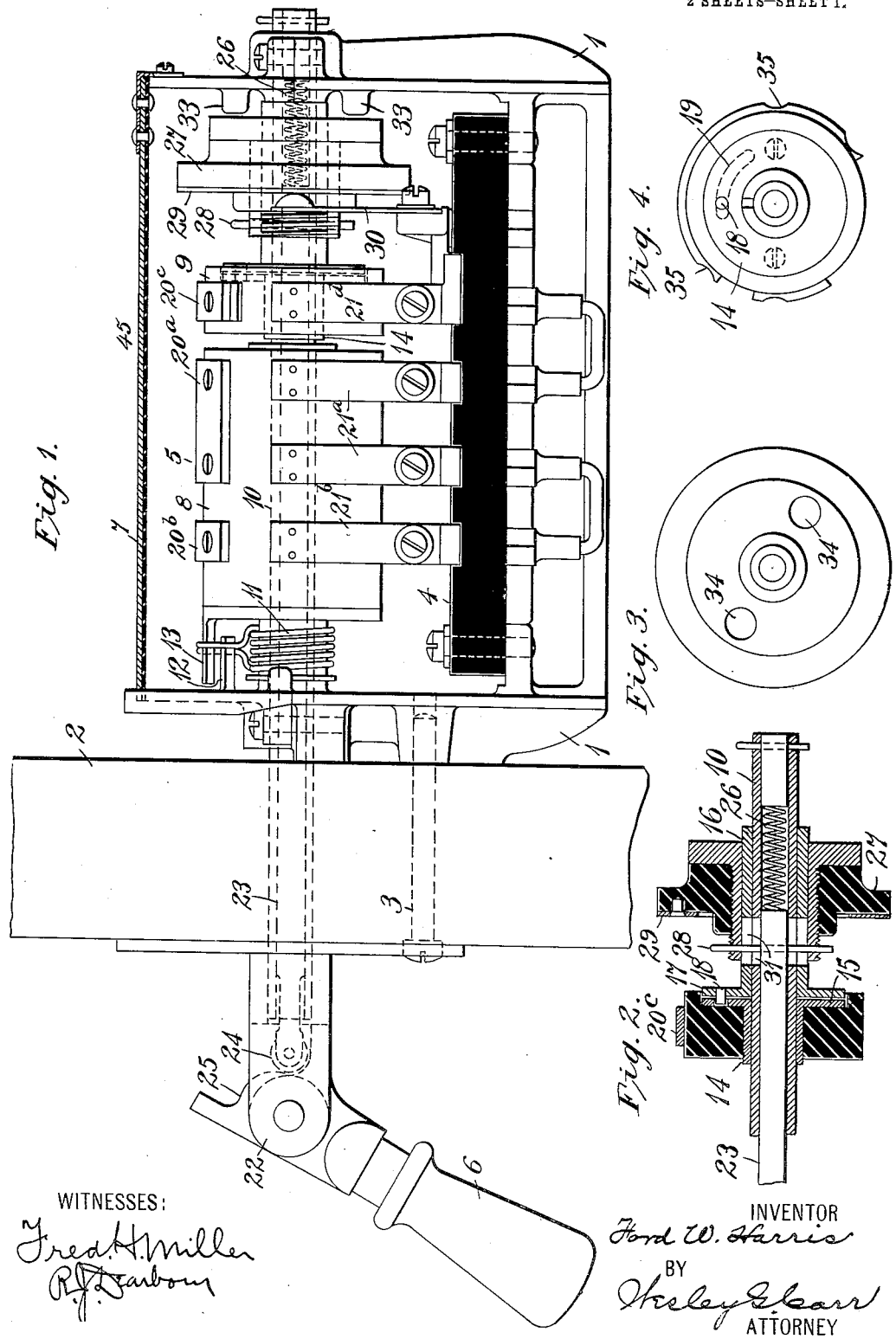
WITNESSES:
Fred H. Miller
INVENTOR
Ford W. Harris
BY
Wesley G. Carr
ATTORNEY F. W. HARRIS.
SYSTEM OF ELECTRIC DISTRIBUTION AND CIRCUIT CONTROL.
APPLICATION FILED OCT. 7, 1908.
1,123,283.  Patented Jan. 5, 1915.
2 SHEETS—SHEET 2.
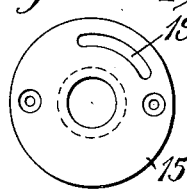
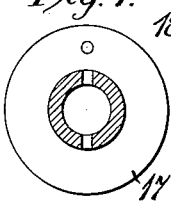
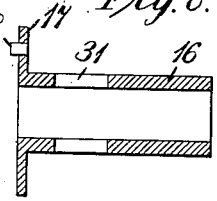
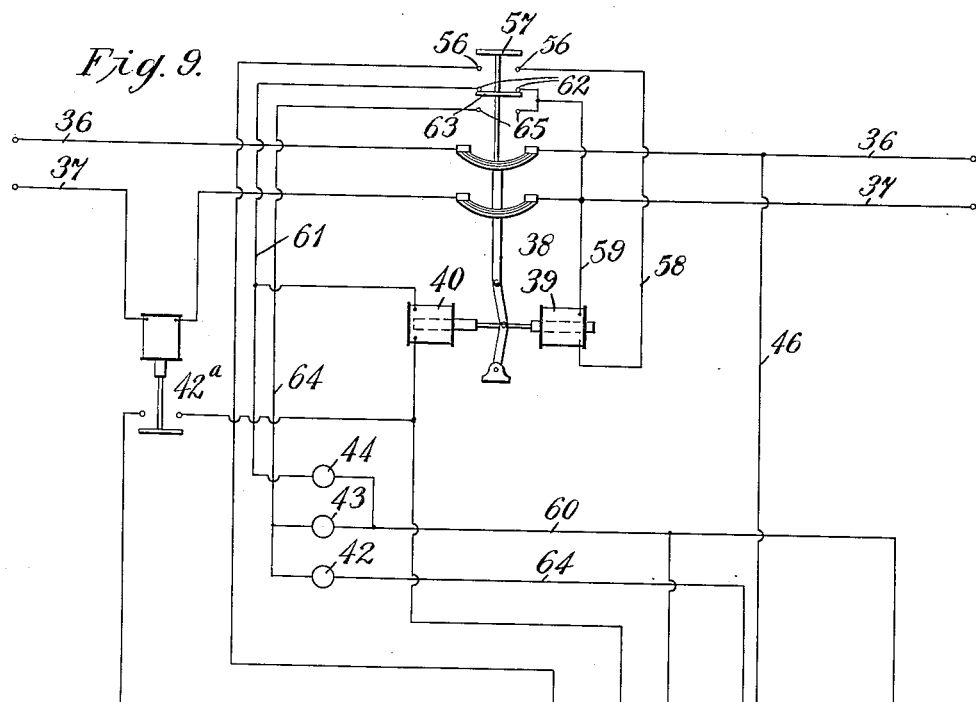
WITNESSES:
Fred H. Miller
R. J. Barbour
INVENTOR
Ford W. Harris
BY
Wesley G. Carr
ATTORNEY

UNITED STATES PATENT OFFICE.

FORD W. HARRIS, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

SYSTEM OF ELECTRIC DISTRIBUTION AND CIRCUIT CONTROL.

1,123,283.  Specification of Letters Patent.  Patented Jan. 5, 1915.

Application filed October 7, 1908. Serial No. 456,615.

*To all whom it may concern:*

Be it known that I, FORD W. HARRIS, a citizen of the United States, and a resident of Wilkinsburg, in the county of Allegheny and State of Pennsylvania, have invented a new and useful Improvement in Systems of Electric Distribution and Circuit Control, of which the following is a specification.

My invention relates to systems of electric distribution and circuit control, and it has for one of its objects to provide a novel and efficient system of the class above indicated which shall embody an automatic circuit interrupter capable of remote control and a simple and desirable controller or switching device for governing the circuit interrupter.

Another object of my invention is to provide audible or visual indicators by which an attendant may be informed, not only of the position of the distant circuit interrupter at the time of the observation, but also the last position which the master switch occupied before it was moved into the observed position.

In order to make the utility of my invention apparent, it is assumed that, when an observation is made by an attendant, the indication is that the circuit-breaker is open. It will be readily understood that it is particularly desirable to know whether the circuit-breaker was opened automatically by reason of an overload or was opened by means of the master controller.

The system is, furthermore, adapted to interrupt the distributing circuit under overload conditions, and the master switch or controller for governing the operation of the breaker is so arranged as to return to its "off" position unless it is manually held in the one or the other of its two operating positions. When the master switch is in its "off" position, it may be locked for the purpose of interrupting the control circuit in which the indicators are included.

Figure 1 of the accompanying drawings is a side elevation of a switching device or controller constructed in accordance with my invention. Figs. 2, 3, 4, 5, 6, 7 and 8 are detail views of the device shown in Fig. 1, and Fig. 9 is a diagrammatic view of the system which embodies a controller shown in the other figures.

Referring to Figs. 1 to 8, inclusive, of the drawings, the controller 45 here illustrated comprises a stationary supporting frame or body 1, which is secured to a face plate or panel 2 by means of screws 3, an insulating plate 4 secured to the frame 1, a movable contact-bearing drum 5, an operating handle 6 and an inclosing casing 7.

The contact-bearing drum 5 comprises two sections 8 and 9, one of which is rigidly connected to a shaft 10 and the other of which is connected thereto by means of a lost-motion connection. The drum section 8 is constrained to return to a position which corresponds to the "off" position of the switch by means of a spring 11 which is coiled about the shaft 10 and the ends of which respectively engage a stationary projection 12 and a projection 13 on the drum. The section 9 is mounted on a bushing 14 which is rotatably mounted on the shaft 10 and is provided with a flange 15. A bushing 16 having a flange 17 is fixed to the shaft 10 and is operatively connected to the other bushing by means of a pin projection 18 which engages a segmental slot 19 in the flange 15. The contact ring segments 20, which are secured to the drum sections 8 and 9, are adapted to be engaged by a plurality of stationary contact fingers 21 that are mounted on the insulating plate 4.

The operating handle lever 6 is secured to the outer end of the shaft 10 by means of a hinge joint 22, the shaft being hollow and containing a rod 23 the outer end of which is provided with a roller 24 to engage a cam surface 25 on the handle lever, and a spring 26 being provided at the opposite end of the rod for forcing the roller into engagement with the cam surface. The inner end of the rod 23, which is engaged by the spring, is secured to a contact-bearing ring member 27 by a pin 28. The end surface of the ring 27 is provided with an annular contact member 29 which is engaged by a pair of contact fingers 30 that project upwardly from the insulating plate 4 to which they are secured.

The shaft 10 and the bushing 16 are provided with longitudinal slots 31 through which the pin 28 projects and the arrangement of parts is such that, when the operating handle is in its normal position, the spring 26 forces the rod 23 and the contact-bearing disk member 27 toward the insulating plate or panel 2, thereby causing the contact fingers 30 to engage the ring contact member 29.

When the operating handle 6 occupies a position corresponding to the off position of the drum, a pair of stationary projections 33 on the stationary frame 1 are directly opposite recesses 34 in the ring member 27 and, if the handle lever is raised when the drum is in this position, the cam surface 25 acts upon the roller 24 and forces the rod 23 and the disk member 27 away from the plate 2. The contact member 29 is consequently moved out of engagement with the stationary contact fingers 30 and, since the recesses 34 of the disk member 27 are engaged by the projections 33, it is obviously impossible for the operating handle or the shaft to be rotated, independent rotation of the rod and shaft being prevented by the engagement of the pin 28 with the slots 31. The contact fingers 21 which engage the drum section 9 are adapted to register with shallow grooves 35 in the contact surfaces of the members 20 in predetermined position, thereby increasing the resistance to operation of the drum from these positions. By this means. the drum section 9 is constrained to lag behind the major portion 8 of the drum to the maximum extent permitted by the lost-motion connection which is established by the engagement of the pin 18 with the segmental slot 19.

Referring to Fig. 9 of the drawings, in which like parts are designated by the same reference characters, a distributing circuit 36—37 is provided with a circuit-breaker 38 having a closing magnet 39, a tripping magnet 40 and an auxiliary switch 57 which is operatively connected to the main breaker. A series relay switch 42ª is provided for the purpose of automatically energizing the release magnet 40, under predetermined conditions in the distributing circuit. A plurality of indicating lamps 42, 43 and 44 are included in the system and a switching device or controller 45, which is intended to be a diagrammatic representation of the device illustrated in Fig. 1 of the drawings, is adapted to govern the circuit-breaker 38 from a remote point. Assuming that the controller 45 occupies its off position and that the circuit-breaker is open; if the controller is moved to position $a$, a circuit will be established from line conductor 36 through conductor 46, contact fingers 30 (that are bridged by a contact member 29), conductor 49, contact fingers 21ª (which are bridged by a contact member 20ª when the controller 45 occupies position $a$), contact finger 21ᵇ, contact member 20ᵇ, finger 21ᶜ, conductor 55, contact terminals 56 (which are bridged by a contact member 57 when the circuit-breaker is open), conductor 58, magnet 39, and conductor 59 to line conductor 37. When energized, the magnet 39 closes the circuit-breaker 38 and the auxiliary switch 57 interrupts the circuit of the closing magnet 39 so that energy is only temporarily supplied thereto. As soon as the circuit-breaker is closed, the main circuit is established and an auxiliary circuit is established from conductor 49 through conductor 60, indicating lamp 44, conductor 61 and contact fingers 62 (which are bridged by a contact member 63 when the circuit-breaker is closed) to the line conductor 37. The lighting of the lamp 44 indicates the position of the circuit interrupter to the attendant who is manipulating the controller at a distant point. As soon as the attendant releases the controller 45 from the position $a$, the circuit-breaker having been closed, the spring 11 will return the drum section 8 to its off position but, by reason of the lost-motion connection between the drum section 9 and the drum section 8, the section 9 will remain stationary. Should the current traversing the distributing circuit exceed a predetermined amount, the series relay switch 42ª will be raised and a circuit will be established, independently of the controller 45, from conductor 46 through switch 42ª, tripping magnet 40, conductor 61, contact fingers 62 and member 63 to the line conductor 37. When energized, the tripping magnet serves to open the circuit-breaker and to interrupt the distributing circuit. As soon as the circuit-breaker occupies its open position, a circuit will be established from conductor 60 through indicating lamp 43, conductor 64, contact fingers 65 (which are now bridged by the contact member 63) to the line conductor 37. Another circuit will be established from conductor 49 through contact fingers 21ᵈ and 21ᵉ which are bridged by a contact segment 20ᶜ that is carried by the drum section 9, indicating lamp 42 and conductor 64, circuit being completed as above indicated. Thus, the fact that the circuit interrupter has been opened automatically by the action of the series relay switch will be made known to the attendant, since both indicating lamps 42 and 43 are lighted. Assuming that the circuit-breaker is again closed and that controller 45 is moved to its position $b$, a circuit will be established from conductor 49 through contact fingers 21ᶠ (which are now bridged by contact member 20ᵈ), conductor 71, and magnet 40 from which point circuit is established as already described. The circuit interrupter will thus be opened but, in moving the controller 45 to position $b$, the contact segment 20ᶜ is moved out of engagement with contact finger 21ᵈ and, consequently, when the controller is returned to its off position from position b, only indicating lamp 43 will be energized. The behavior of the indicating lamps may be outlined as follows: When the lamp 44 is lighted, the circuit-breaker is closed; when lamps 42 and 43 are both lighted, the circuit-breaker has been opened by reason of the closure of the series relay switch and when only lamp 43 is lighted, the circuit-breaker has been opened by means of the controller 45.

It is to be understood that structural modifications may be effected in the controller illustrated, and that variations in the circuit connections may be made within the spirit and scope of my invention.

I claim as my invention:

1. In a controller, the combination with a rotatable shaft, a contact-bearing drum secured thereto, means for retracting the said drum to a predetermined position, and a plurality of stationary contact members, of a second drum member rotatably mounted on said shaft and connected to the first drum by a lost-motion connection and means for locking one of the drums against rotation when in its off position.

2. In a controller, the combination with a pair of contact-bearing drums, stationary contact fingers therefor, and resilient means for retracting one of said drums to a predetermined position, of means for operatively connecting the drums together by a lost-motion connection, means for locking one of the drums against rotation and means for accentuating predetermined positions of the second drum.

3. The combination with a rotatable shaft, two drum sections secured thereto and movably mounted thereon respectively, a lost-motion connection between the drum sections, a plurality of stationary contact fingers, and a spring for retracting the shaft and one of the drum sections to a predetermined position, of an operating handle for the shaft, and means dependent on said handle for locking the shaft against rotation.

4. In a controller, the combination with a rotatable shaft, an operating handle lever therefor, a pair of drum sections one of which is loosely and the other rigidly mounted upon said shaft, contact ring segments mounted on said sections, and stationary contact fingers coöperating with said ring segments, of a lost-motion connection between the drum sections, and means for locking the loose drum section under predetermined conditions and means for accentuating predetermined positions of contact between the stationary fingers and the loose drum section.

In testimony whereof, I have hereunto subscribed my name this 25th day of Sept., 1908.

FORD W. HARRIS.

Witnesses:
FRED W. CLOUD,
BIRNEY HINES.